(12) United States Patent
Brossard et al.

(10) Patent No.: US 10,303,032 B2
(45) Date of Patent: May 28, 2019

(54) ELECTROCHROMIC DEVICE INCLUDING A MEANS FOR PREVENTING ION MIGRATION AND A PROCESS OF FORMING THE SAME

(71) Applicant: SAGE ELECTROCHROMICS, INC., Faribault, MN (US)

(72) Inventors: Sophie Brossard, Minneapolis, MN (US); Jean-Christophe Giron, Edina, MN (US); Charles Leyder, Cambridge, MA (US); João Abreu, Paris (FR)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 65 days.

(21) Appl. No.: 15/586,897

(22) Filed: May 4, 2017

(65) Prior Publication Data
US 2017/0322473 A1 Nov. 9, 2017

Related U.S. Application Data

(60) Provisional application No. 62/333,386, filed on May 9, 2016.

(51) Int. Cl.
*G02F 1/153* (2006.01)
*G02F 1/155* (2006.01)
*C03C 17/36* (2006.01)

(52) U.S. Cl.
CPC ............ *G02F 1/1533* (2013.01); *C03C 17/36* (2013.01); *C03C 17/3618* (2013.01);
(Continued)

(58) Field of Classification Search
CPC ...... G02F 1/15; G02F 1/163; G02F 2001/151; G02F 2001/1512; G02F 2001/1515;
(Continued)

(56) References Cited

U.S. PATENT DOCUMENTS 4,927,246 A 5/1990 Ito et al.
5,080,471 A 1/1992 Cogan et al.
(Continued)

FOREIGN PATENT DOCUMENTS

CN 103144380 A 6/2013
CN 103145347 A 6/2013
(Continued)

OTHER PUBLICATIONS

International Search Report & Written Opinion for PCT/US2017/031057, dated Aug. 4, 2017, 13 pages.

*Primary Examiner* — William Choi
(74) *Attorney, Agent, or Firm* — Abel Schillinger, LLP; Robert N. Young (57) ABSTRACT

An electrochromic device can include a substrate; an electrochromic layer or a counter electrode layer over the substrate and including a mobile ion; a first transparent conductive layer over the substrate and including Ag. In one embodiment, the electrochromic device can include a barrier layer disposed between first transparent conductive layer and the electrochromic or counter electrode layer. In another embodiment, the electrochromic device can include means for preventing (1) the mobile ion from migrating into the first transparent conductive layer, (2) Ag from migrating into the electrochromic layer or counter electrode layer, or both (1) and (2). A process of forming an electrochromic device can include forming an electrochromic layer or a counter electrode layer over a substrate; forming a barrier layer; and forming a first transparent conductive layer over the substrate.

18 Claims, 4 Drawing Sheets

(52) U.S. Cl.
CPC ...... *C03C 17/3644* (2013.01); *C03C 17/3652* (2013.01); *C03C 17/3681* (2013.01); *G02F 1/155* (2013.01); *C03C 17/366* (2013.01); *C03C 2218/322* (2013.01); *C03C 2218/326* (2013.01); *G02F 2001/1536* (2013.01); *G02F 2001/1555* (2013.01)

(58) Field of Classification Search
CPC ..... G02F 2001/1536; G02F 2001/1552; G02F 2001/1555; G02F 2001/1557; G02F 1/155; G02F 1/153; G02F 1/1533; G02F 2001/1502
USPC .................................................. 359/265–275
See application file for complete search history.

(56) References Cited

U.S. PATENT DOCUMENTS

| | | |
|---|---|---|
| 5,321,544 A | 6/1994 | Parkhe et al. |
| 5,659,417 A | 8/1997 | Van Dine et al. |
| 5,699,192 A | 12/1997 | Van Dine et al. |
| 5,724,177 A | 3/1998 | Ellis et al. |
| 6,515,787 B1 | 2/2003 | Westfall et al. |
| 6,822,778 B2 | 11/2004 | Westfall et al. |
| 7,265,890 B1 | 9/2007 | Demiryont |
| 7,985,919 B1 | 7/2011 | Roscheisen et al. |
| 8,031,389 B2 | 10/2011 | Wang et al. |
| 2007/0000537 A1 | 1/2007 | Leidholm et al. |
| 2007/0153355 A1 | 7/2007 | Huang et al. |
| 2009/0004386 A1 | 1/2009 | Makela et al. |
| 2009/0323161 A1 | 12/2009 | Fuss et al. |
| 2011/0189815 A1 | 8/2011 | Sager et al. |
| 2012/0202037 A1* | 8/2012 | Ryabova .................. C09D 5/24 428/220 |
| 2014/0020737 A1 | 1/2014 | Jung et al. |
| 2014/0022621 A1 | 1/2014 | Kailasam et al. |
| 2014/0048013 A1 | 2/2014 | Ding et al. |
| 2014/0182125 A1 | 7/2014 | Rozbicki et al. |
| 2015/0083461 A1* | 3/2015 | Burberry .................. H01B 1/08 174/126.2 |

FOREIGN PATENT DOCUMENTS

| | | |
|---|---|---|
| CN | 103771724 A | 5/2014 |
| CN | 103864314 A | 6/2014 |

* cited by examiner

ELECTROCHROMIC DEVICE INCLUDING A MEANS FOR PREVENTING ION MIGRATION AND A PROCESS OF FORMING THE SAME

CROSS-REFERENCE TO RELATED APPLICATION

The present application claims priority under 35 U.S.C. § 119(e) to U.S. Provisional Patent Application No. 62/333,386, filed May 9, 2016, entitled "Electrochromic Device Including a Means For Preventing Ion Migration and a Process of Forming the Same," naming as inventors Sophie Brossard et al., which application is assigned to the current assignee hereof and is incorporated by reference herein in its entirety.

FIELD OF THE DISCLOSURE

The present disclosure is directed to electrochromic devices, and more specifically to electrochromic devices including means for preventing ion migration and processes of forming the same.

BACKGROUND

An electrochromic device helps to block the transmission of visible light and keep a room of a building or passenger compartment of a vehicle from becoming too warm. A low-emissivity film can be used to reflect solar heat, which can also help keep a room of a building or passenger compartment of a vehicle from becoming too warm. The low-emissivity film can include Ag and is spaced apart and not part of the electrochromic device. Further improvement of window designs is desired.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

In this specification, refractive indices are measured at 550 nm.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about", "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the glass, vapor deposition, and electrochromic arts.

In an aspect, an electrochromic device can include a substrate; an electrochromic layer or a counter electrode layer over the substrate, wherein the electrochromic or counter electrode layer includes a mobile ion; a first transparent conductive layer over the substrate and including Ag; and a barrier layer disposed between first transparent conductive layer and the electrochromic or counter electrode layer. In another aspect, an electrochromic device can include a substrate; an electrochromic layer or a counter electrode layer over the substrate, wherein the electrochromic or counter electrode layer includes a mobile ion; a first transparent conductive layer over the substrate and including Ag; and means for preventing (1) the mobile ion from migrating into the first transparent conductive layer, (2) Ag from migrating into the electrochromic layer or counter electrode layer, or both (1) and (2).

In a further aspect, a process of forming an electrochromic device can include providing a substrate; forming an electrochromic layer or a counter electrode layer over the substrate, wherein after forming the electrochromic or counter electrode layer, the electrochromic or counter electrode layer includes a mobile ion. The process can further include forming a barrier layer and forming a first transparent conductive layer over the substrate and including Ag, wherein forming the barrier layer is formed between forming the electrochromic or counter electrode layer and forming the first transparent conductive layer.

The incorporation of Ag into a transparent conductive layer of the electrochromic device allows for a low emissivity electrochromic stack, and thus, a separate low emissivity film spaced apart from the electrochromic stack is not needed. However, the inventors discovered that when Ag is present in the transparent conductive layer, the electrochromic device may operate properly once, operate for less than a few hours, or may not operate properly at all. Although not to be bound by theory, mobile ions, such as Li+, may be migrating into a transparent conductive layer. Alternatively, Ag may be migrating into an electrochromic layer or a counter electrode layer and competing or interfering with the mobile ions. The barrier layer or means for preventing migration of mobile ions or Ag allows for the integration of a low emissivity film within a layer of an electrochromic stack and still maintain acceptable performance of an electrochromic device.

The embodiments as illustrated in the figures and described below help in understanding particular applications for implementing the concepts as described herein. The embodiments are exemplary and not intended to limit the scope of the appended claims.

Figure 1:
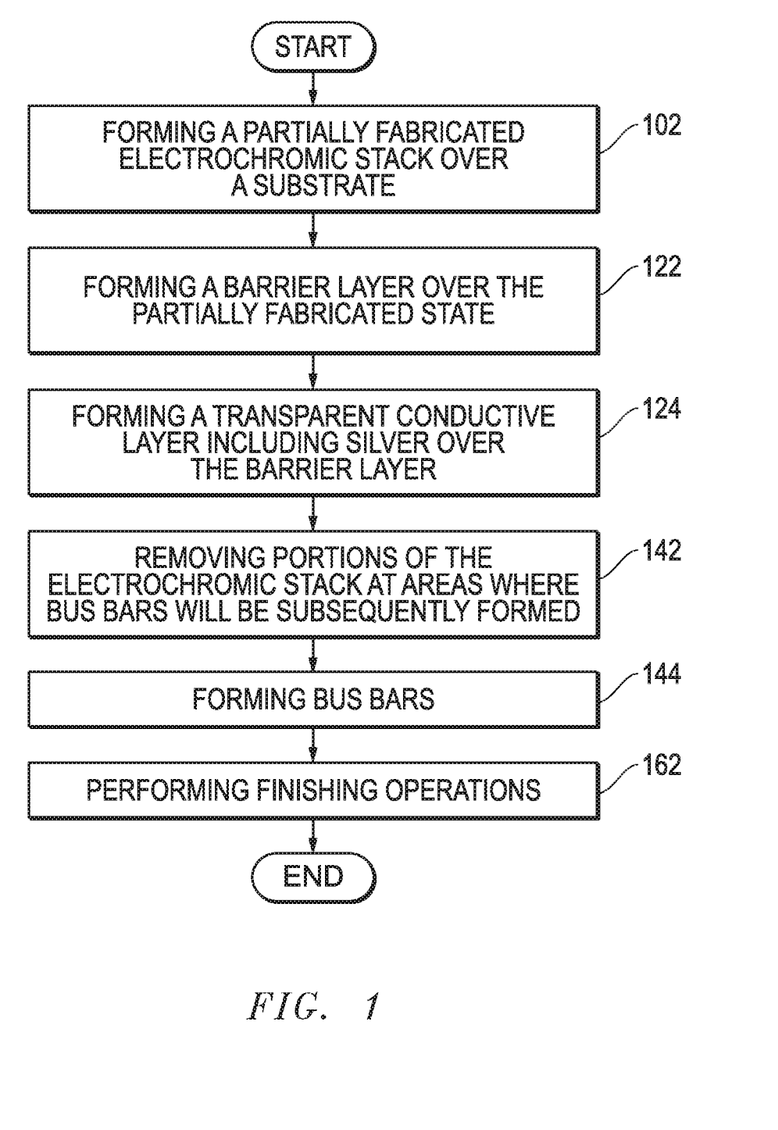
FIG. 1 includes a flow diagram for a process of forming an electrochromic device in accordance with an embodiment as described herein.
Figure 2:
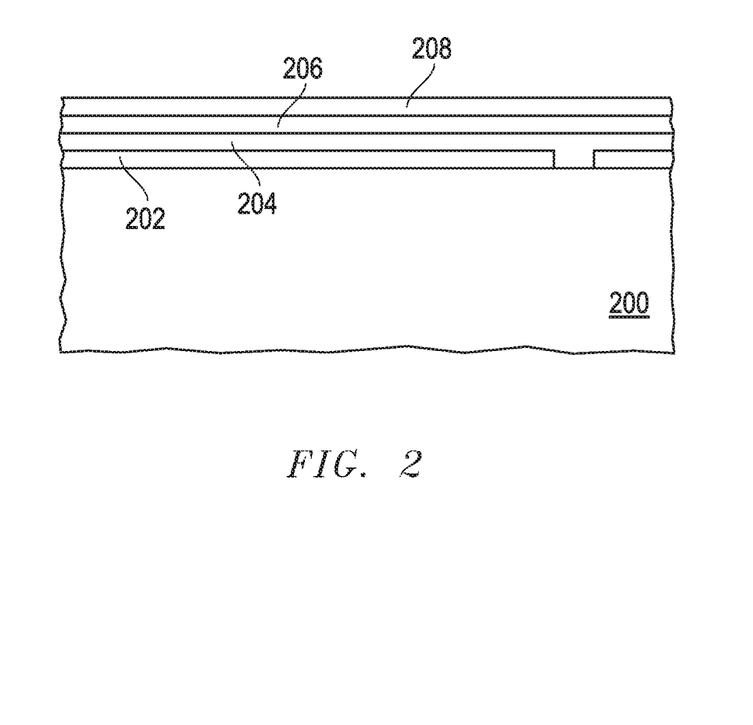
FIG. 2 includes an illustration of a cross-sectional view of a workpiece including a substrate and a partially formed electrochromic stack.

FIG. 1 includes a process flow of forming an electrochromic device in accordance with an embodiment. The process can include forming a partially fabricated electrochromic stack over a substrate, at block 102. FIG. 2 includes an illustration of a cross-section view of a partially fabricated electrochromic device after forming an electrochromic stack. The electrochromic device can include a transparent substrate 200 that includes a glass substrate, a sapphire substrate, an aluminum oxynitride (AlON) substrate, a spinel substrate, or a transparent polymer. In a particular embodiment, the transparent substrate 200 can include ultra-thin glass that is a mineral glass having a thickness in a range of 50 microns to 300 microns. The transparent polymer can include a polyacrylate, a polyester, a polycarbonate, a polysiloxane, a polyether, a polyvinyl compound, another suitable class of transparent polymer, or a mixture thereof. In another embodiment, the transparent substrate 200 can be a laminate including layers of the materials that make up the previously described transparent substrates. In another embodiment, the laminate can include a solar control layer that reflects ultraviolet radiation or a low emissivity material. The substrate 200 may or may not be flexible.

In an embodiment, the transparent substrate 200 can be a glass substrate that can be a mineral glass including $SiO_2$ and one or more other oxides. Such other oxides can include $Al_2O_3$, an oxide of an alkali metal, an oxide of an alkaline earth metal, $B_2O_3$, $ZrO_2$, $P_2O_5$, ZnO, $SnO_2$, $SO_3$, $As_2O_2$, or $Sb_2O_3$. The transparent substrate 200 may include a colorant, such as oxides of iron, vanadium, titanium, chromium, manganese, cobalt, nickel, copper, cerium, neodymium, praseodymium, or erbium, or a metal colloid, such as copper, silver, or gold, or those in an elementary or ionic form, such as selenium or sulfur.

In an embodiment in which the transparent substrate 200 is a glass substrate, the glass substrate is at least 50 wt % $SiO_2$. In an embodiment, the $SiO_2$ content is in a range of 50 wt % to 85 wt %. $Al_2O_3$ may help with scratch resistance, for example, when the major surface is along an exposed surface of the laminate being formed. When present, $Al_2O_3$ content can be in a range of 1 wt % to 20 wt %. $B_2O_3$ can be usefully used to reduce both the viscosity of the glass and its thermal expansion coefficient. The $B_2O_3$ content may be no greater than 20 wt %, and in a particular embodiment, less than 15 wt %. Alkaline earth metals include magnesium, calcium, strontium, and barium. The oxides of an alkaline earth metal are useful for reducing the viscosity of the glass and facilitating fusion, without heavily penalizing the expansion coefficient. Calcium and magnesium have a relatively low impact on the density of the glass as compared to some of the other oxides. The total content of alkaline metal oxide may be no greater than 25 wt %, 20 wt %, or 15 wt %. Oxides of an alkali metal can reduce viscosity of the glass substrate and its propensity to devitrify. The total content of alkali metal oxides may be at most than 8 wt. %, 5 wt. %, or 1 wt. %. In some applications, the glass substrate is desired to be clear, and thus, the content of colorants is low. In a particular embodiment, the iron content is less than 200 ppm.

The glass substrate can include heat-strengthened glass, tempered glass, partially heat-strengthened or tempered glass, or annealed glass. "Heat-strengthened glass" and "tempered glass", as those terms are known in the art, are both types of glass that have been heat treated to induce surface compression and to otherwise strengthen the glass. Heat-treated glasses are classified as either fully tempered or heat-strengthened. In an embodiment, the glass substrate is tempered glass and has a surface compression of about 69 MPa or more and an edge compression of about 67 MPa or more. In another embodiment, the transparent substrate is heat-strengthened and has a surface compression in a range of 24 MPa to 69 MPa and an edge compression between 38 MPa and 67 MPa. The term "annealed glass" means glass produced without internal strain imparted by heat treatment and subsequent rapid cooling. Thus annealed glass only excludes heat-strengthened glass or tempered glass. The glass substrate can be laser cut.

A transparent conductive layer 202 overlies the transparent substrate 200. The transparent conductive layer 202 can include doped metal oxide. The doped metal oxide can include a zinc oxide or a tin oxide, either of which may be doped with a Group 13 element, such as Al, Ga, or In. Indium tin oxide (ITO) and aluminum zinc oxide (AZO) are exemplary, non-limiting materials that can be used. In another embodiment, the transparent conductive layer 202 can be a polyaniline, polypyrrole, a polythiophene (e.g., poly(3,4-ethylenedioxythiophene) (PDOT)), another suitable conductive organic polymer, or any combination thereof. If needed or desired, the organic compound may be sulfonated. As illustrated in FIG. 2, the transparent conductive layer 202 has a cut to allow a subsequently-formed bus bar to contact the right-hand portion of the transparent conductive layer 202 without electrically shorting such bus bar to the left-hand portion of the transparent conductive layer 202. The transparent conductive layer 202 has a thickness in a range of 150 nm to 600 nm.

An electrode layer 204, an electrolyte layer 206, and another electrode layer 208 overlie the transparent conductive layer 202 and the transparent substrate 200. The electrode layer 204 can be the electrochromic (EC) layer or the counter electrode (CE) layer, and the electrode layer 208 is the other of the CE layer or the EC layer.

The EC layer can have a variable transmission of visible light and near infrared radiation (e.g., electromagnetic radiation having wavelengths in a range of 700 nm to 2500 nm) depending on the biasing conditions. For example, in the absence of an electrical field, the electrochromic device is in a high transmission ("bleached") state, and in the presence of an electrical field, mobile ions, such as $Li^+$, $Na^+$, or $H^+$, can migrate from the CE layer, through the electrolyte layer to the EC layer and reduce the transmission of visible light and near infrared radiation through the electrochromic device. The lower transmission state may also be referred to as a tinted or colored state. The EC layer can include an oxide of a transition metal, such as iridium, rhodium, ruthenium, tungsten, manganese, cobalt, or the like. In a particular embodiment, the EC layer includes $WO_3$. As initially formed, the EC layer may not include any significant amount of the mobile ions that cause the EC layer to have a reduced transmission. In another embodiment, the EC layer may include at least some mobile ions, however, the electrochromic device may be reverse biased to move the mobile ions from the EC layer, through the electrolyte layer 206 to the CE layer. In an embodiment, the thickness of the EC layer as deposited is in a range 80 nm to 600 nm.

The CE layer can provide a principal source of mobile ions. Furthermore, the CE layer remains substantially transparent to visible light when the electrochromic device is in its high transmission state and its low transmission state. The CE layer can include an oxide of transition metal element. In embodiment, the CE layer can include an oxide of nickel. The nickel may be in its divalent state ($Ni^{2+}$), its trivalent state ($Ni^{3+}$), or a combination thereof. The CE layer can include an oxide of a transition metal element, such as such as iridium, rhodium, ruthenium, tungsten, manganese, cobalt, or the like. The CE layer can also provide mobile ions that can pass through the electrolyte layer 206. The mobile ions may be incorporated into the CE layer as it is formed. In a finished device, the CE layer may be represented by a chemical formula of:

$$A_x Ni^{2+}_{(1-y)} Ni^{3+}_y M_z O_a,$$

where:

A is an element that produces a mobile ion, such as Li, Na, or H;

M is a metal; and $0 \leq x \leq 10$, $0 \leq y \leq 1$, $0 \leq z \leq 10$, and $(0.5x+1+0.5y+z) \leq a \leq (0.5x+1+0.5y+3.5z)$.

In a particular non-limiting embodiment, A is Li, M is W, and, in a finished device, the CE layer may be represented by a chemical formula of:

$$Li_x Ni^{2+}_{(1-y)} Ni^{3+}_y W_z O_{(1+0.5x+0.5y+3z)},$$

where $1.5 \leq x \leq 3$, $0.4 \leq y \leq 0.95$, and $0.15 \leq z \leq 1$.

In an embodiment, the thickness of the CE layer is in a range 80 nm to 500 nm.

The electrolyte layer 206 includes a solid electrolyte that allows ions to migrate through the electrolyte layer 206 as an electrical field across the electrolyte layer is changed from the high transmission state to the low transmission state, or vice verse. In an embodiment, the electrolyte layer 206 can be a ceramic electrolyte. In another embodiment, the electrolyte layer 206 can include a silicate-based or borate-based material. The electrolyte layer 206 may include a silicate, an aluminum silicate, an aluminum borate, a borate, a zirconium silicate, a niobate, a borosilicate, a phosphosilicate, a nitride, an aluminum fluoride, or another suitable ceramic material. Other suitable ion-conducting materials can be used, such as tantalum pentoxide or a garnet or perovskite material based on a lanthanide-transition metal oxide. In another embodiment, as formed, the electrolyte layer 206 may include mobile ions. Thus, lithium-doped or lithium-containing compounds of any of the foregoing may be used. Alternatively, a separate lithiation operation, such as sputtering lithium, may be performed. The electrolyte layer 206 may include a plurality of layers having alternating or differing materials, including reaction products between at least one pair of neighboring layers. In a further embodiment, the refractive index and thickness of the electrolyte layer 206 are selected to have acceptable visible light transmission while keeping electronic current very low. In another embodiment, the electrolyte layer 206 has low or no significant electronic conductivity (e.g., low leakage current). The thickness of the electrolyte layer 206 can be in a range of 10 nm to 70 nm.

The method can further include forming a barrier layer over the electrochromic stack, at block 122 in FIG. 1. The barrier layer helps to prevent or at least reduce the likelihood that (1) Ag from a subsequently-formed layer migrated into an underlying layer, (2) a mobile ion from an underlying layer migrates into a subsequently-formed layer, or both (1) and (2). Accordingly, the barrier layer helps to allow a conductive layer including Ag to be used without causing premature device failure or unacceptable performance.

Figure 3:
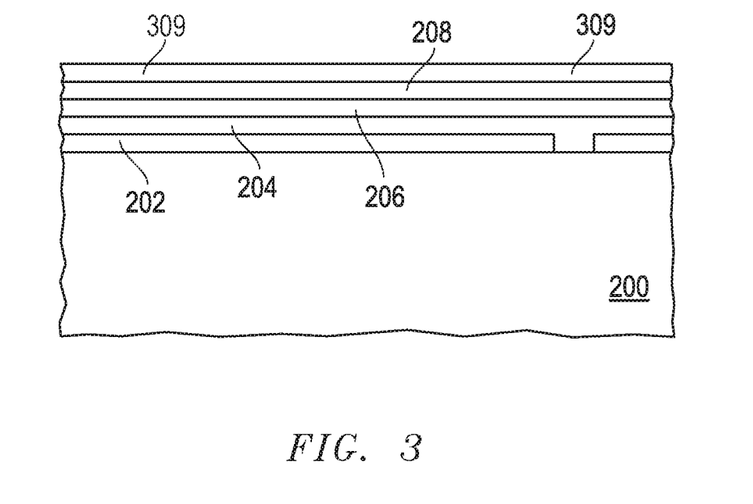
FIG. 3 includes an illustration of a cross-sectional view of the workpiece of FIG. 2 after forming a barrier layer.

FIG. 3 includes an illustration of the electrochromic device after forming barrier layer 309 over the layer 208. The barrier layer 309 can include an oxide or a nitride of a trivalent, tetravalent, or pentavalent metal. In an embodiment, the barrier layer 309 can include $Al_2O_3$, $TiO_2$, $Ta_2O_5$, $ZrO_2$, $HfO_2$, another suitable metal oxide, or the like. In a particular embodiment, the barrier layer 309 includes $Al_2O_3$ or $TiO_2$. In another embodiment, the barrier layer 309 can include AN, TiN, TaN, ZrN, HfN, another suitable metal nitride, or the like. In a further embodiment, the barrier layer 309 can include a metal-silicon compound, such as a titanium silicon nitride, a tantalum silicon nitride, or a tungsten silicon nitride.

The thickness of the barrier layer 309 is selected to provide sufficient transmission of visible light (e.g., >75% transmission of electromagnetic radiation at wavelengths in a range of 400 nm to 700 nm). In an embodiment, the thickness of the barrier layer 309 is sufficient to provide a continuous layer. The thickness of the barrier layer 309 is at least 5 nm, at least 11 nm, or at least 15 nm. The barrier layer 309 may not be so thick as to prevent charge carriers from tunneling or otherwise passing through the barrier layer 309. The thickness of the barrier layer 309 is at most 200 nm, at most 100 nm, or at most 80 nm. In a particular embodiment, the barrier layer 309 is in a range of 5 nm to 200 nm, 11 nm to 100 nm, or 15 nm to 80 nm.

The barrier layer 309 can be formed as a conformal layer over layer 208. In an embodiment, the barrier layer 309 can be formed by atomic layer deposition (ALD). In another embodiment, the barrier layer 309 can be formed by chemical vapor deposition (CVD). The deposition may be performed using a plasma-assisted technique or without plasma assistance. ALD can have better thickness control as compared to CVD. Accordingly, ALD is well suited to forming the barrier layer 309.

A metal-containing precursor for the barrier layer 309 can include an organometallic compound, a metal halide, or a metal carbonyl compound. In an embodiment, the organometallic compound includes a metal alkyl compound, a metal alkoxide compound, or a dialkyl-amino metal, wherein each alkyl group or alkoxide group has no more than four carbon atoms. In a particular embodiment, the organometallic compound includes a tetrakis(alkyl) metal (IV), a tetrakis(dialkylamino) metal (IV), a tetrakis(alkoxide) metal (IV), or a bis(alkylcyclopentadienyl)alkoxyalkyl metal (IV), wherein each alkyl group and each alkoxide group has at most four carbon atoms. In another particular embodiment the organometallic compound includes a pentakis(alkyl) metal (V), a pentakis(dialkylamino) metal (V), or a pentakis(alkoxide) metal (V), wherein each alkyl group and each alkoxide group has at most four carbon atoms. When an aluminium-containing compound is being formed, the organometallic compound can includes $Al(CH_3)_3$. In a particular embodiment, the barrier layer 309 includes silicon, and the barrier layer 309 can be formed using a silicon-containing gas. For example, the barrier layer 309 may include a titanium silicon nitride, a tantalum silicon nitride, or a tungsten silicon nitride. When the barrier layer 309 includes a metal oxide, the metal precursor can be reacted with $H_2O$, $H_2O_2$, $O_2$, or $O_3$, or any combination thereof. When the barrier layer 309 includes a metal nitride, the metal precursor can be reacted with gas can include $NH_3$, $N_2H_2$, or a mixture of $N_2$ and $H_2$, or any combination thereof.

For ALD, a monolayer of the metal-containing precursor can be formed along an exposed surface. The metal-containing precursor can be reacted with an oxygen-containing gas or a nitrogen-containing gas to form the metal oxide or nitride. The deposition of the monolayer and reaction are iterated until the desired thickness of the layer is achieved. The barrier layer 309 is dense, conformal, and substantially pinhole free. The deposition temperature may be performed at a temperature less than 100° C.

Figure 4:
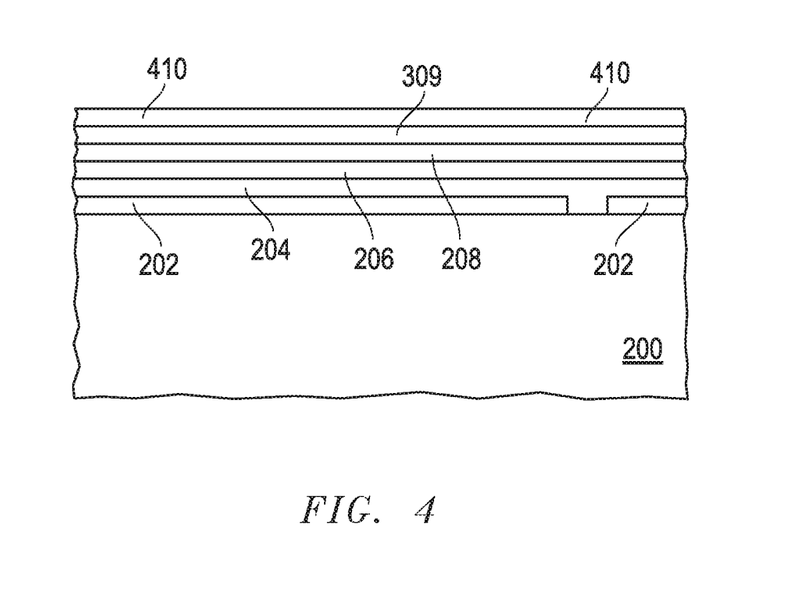
FIG. 4 includes an illustration of a cross-sectional view of the workpiece of FIG. 3 after forming a transparent conductive layer.

The method can further include forming a transparent conductive layer including Ag over the barrier layer, at block 124 in FIG. 1. Referring to FIG. 4, a transparent conductive layer 410 overlies the transparent substrate 200, the transparent conductive layer 202, the electrode layer 204, the electrolyte layer 206, the electrode layer 208, and the barrier layer 309. The transparent conductive layer 410 can include one or more films. One of the films includes Ag to provide good conductivity and low emissivity. Thus, a separate low-emissivity layer spaced apart from the electrochromic stack is not needed. In an embodiment, an oxide film or a nitride film may lie along one or both sides of the Ag film. In an embodiment, a seed film may be used. In a particular embodiment, the seed layer may include a transparent conductive oxide. The transparent conductive oxide can include a doped metal oxide, such as a doped zinc oxide or a doped tin oxide, either of which may be doped with a Group 13 element, such as Al, Ga, or In. Indium tin oxide (ITO) and aluminum zinc oxide (AZO) are exemplary, non-limiting materials that can be used.

The barrier layer 309, a film within the transparent conductive layer 410, or both can include a material with a relatively high index of refraction. The transparent conductive layer 410 may also include a film having the intermediate index of refraction that is between the indices of refraction of (1) the barrier layer 309 or a film within the transparent conductive layer (e.g., AZO or ITO) and (2) Ag, air or another gas. The film of intermediate index of refraction can help to reduce total reflection. In an embodiment, the film having the intermediate index of refraction can include $SiO_2$. For any film within the transparent conductive layer 402 that includes a material that is normally considered an insulator (e.g., $SiO_2$, $Si_3N_4$, or the like) may have a thickness less than 50 nm.

In another embodiment, the transparent conductive layer 402 may include a thin blocker layer can be used and may include NiCr, Ti, $NiCrO_x$, $TiO_x$, or a mixture thereof, wherein 1≤x≤2, to reduce the likelihood of oxidizing Ag when AZO or another transparent conductive oxide is in contact with the Ag. A blocker layer may overlie or underlie the Ag or blocker layers may overlie and underlie the Ag. The blocker layer may not be required in all embodiments. When present, the blocker layer can have a thickness in a range of 0.5 nm to 5 nm.

Many different film stacks may be used for the transparent conductive layer 410. An exemplary, non-limiting stack includes $SiO_2$/AZO/Xo/Ag/Xu/AZO/$SiO_2$, where Xo is the blocker layer overlying the Ag, and Xu is the blocker layer underlying the Ag. Xo and Xu can have any one of the compositions and thicknesses previously described with respect to the optional blocker layer. Xo and Xu may have the same composition or different compositions and may have the same thickness or different thicknesses. In another embodiment, the top and bottom part of the stack may be a transparent oxide layer, a transparent nitride layer, or any combination thereof. Thus, $SiO_2$ in the prior example may be replaced by or used in conjunction with $Si_3N_4$, $TiO_x$, $SnO_x$, $SnZnO_x$ (composition Sn:Zn can vary from 10:90 to 90:10), $SiZrO_x$, SiZrN, $ZrO_x$, wherein 1≤x≤2.

Other than the barrier layer 309, all other layers within the EC stack can be formed by physical vapor deposition. Alternatively, any one or more such other layers may alternatively be formed using chemical vapor deposition, atomic layer deposition, another suitable technique, or any combination thereof.

Figure 5:
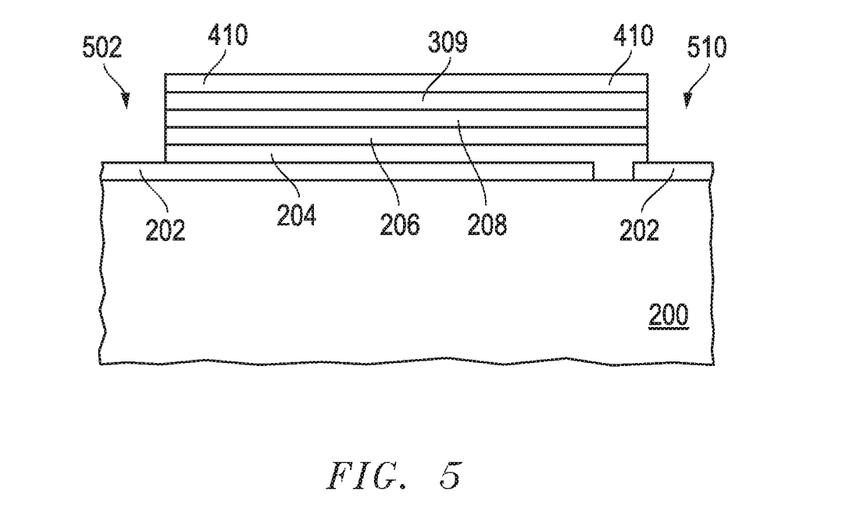
FIG. 5 includes an illustration of a cross-sectional view of the workpiece of FIG. 4 after patterning the electrochromic stack.

In the embodiment as illustrated, the method can include removing portions of the electrochromic stack at areas where bus bars will be subsequently formed, at block 142 of FIG. 1. In FIG. 5, the layers 204, 206, 208, 309, and 410 are patterned to define openings 502 and 510, in which the transparent conductive layer 202 is exposed. In another embodiment, the opening 510 may extend to a different depth as compared to opening 502. For example, the opening 510 may extend to a variety of different depths, so long as the transparent conductive layer 410 is exposed within the opening 510. For example, the layer 410 is patterned such that an Ag film within the transparent conductive layer 410 is exposed along the bottom of the opening 510. In another embodiment, the opening 510 can be extended through the transparent conductive layer 202 such that the substrate 200 is exposed along the bottom of the opening 510. After reading this specification, skilled artisans will be able to determine a depth for the opening 510 that meets the needs or desires for a particular application. The removal of the portions of the electrochromic stack may be performed using an ablating technique, such as laser ablation, or may be removed using an etching technique. After reading this specification, skilled artisans will understand that other portions of the electrochromic device may also have laser removal operations to pattern or remove portions of one or more layers at this time or at another time for reasons independent of bus bar formation. Furthermore, a bus bar may be formed over all of the layers of the EC stack and not be formed within a laser line.

Figure 6:
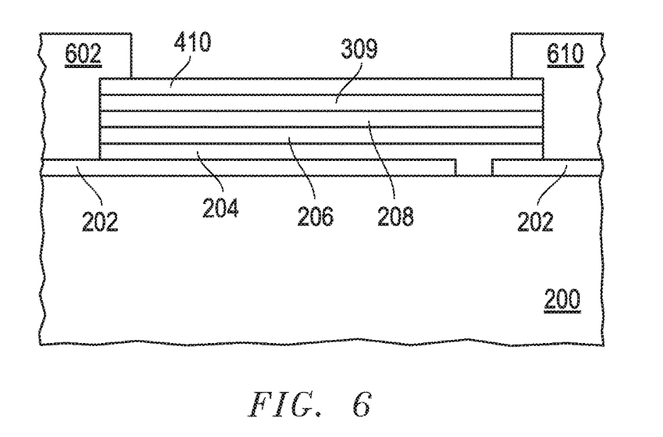
FIG. 6 includes an illustration of a cross-sectional view of the workpiece of FIG. 5 after forming bus bars.

The method can further include forming bus bars, at block 144 in FIG. 1. The bus bars can be formed by depositing a bus bar precursor. In an embodiment, the bus bar precursor can be a silver paste. The bus bar precursor can be fired to form the bus bars. FIG. 6 includes as illustration after forming the bus bars 602 and 610. In an embodiment, the thickness of the bus bars 602 and 610 in a range of 12 microns to 40 microns. After reading this specification, skilled artisans will be able to determine a thickness to provide needed or desired electrical properties of the bus bars 602 and 610.

Figure 7:
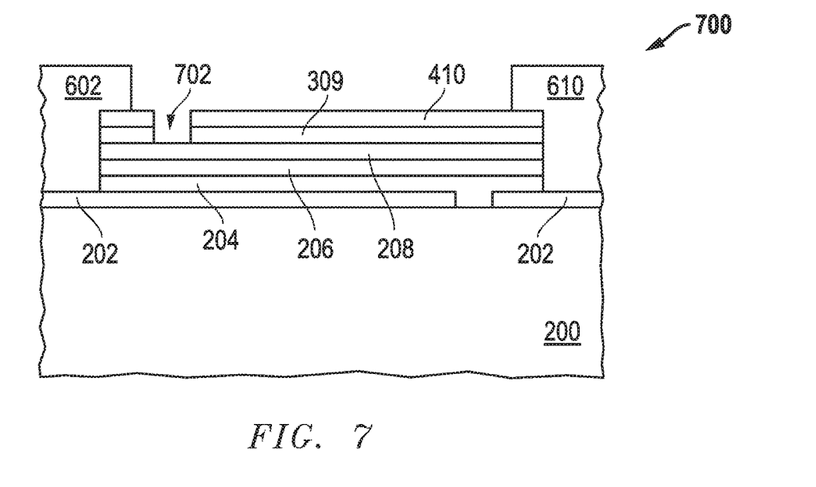
FIG. 7 includes an illustration of a cross-sectional view of the workpiece of FIG. 6 after forming a substantially completed electrochromic device.

The method can further include performing finishing operations, at block 162 in FIG. 1. The particular finishing operation may depend on the particular application. As illustrated in FIG. 7, portions of the layers 410 and 309 are removed at opening 702, so that the bus bar 602 is not electrically connected to most of the transparent conductive layer 410. Thus, the bus bar 602 is a principal connection for the transparent conductive layer 202, and the bus bar 610 is a principal connection for the transparent conductive layer 410. At this point in the process, an electrochromic device 700 is formed. In another embodiment (not illustrated), the bus bar 602 is formed such that it does not contact the side of the stack within the opening 502, as illustrated in FIG. 5. In this embodiment, the removal of the portions of the layers 410 and 309 is not needed. In a further embodiment, the opening 702 may not extend through the barrier layer 309 if the barrier layer 309 is an electronic insulator.

In a further embodiment, the electrochromic device 700 can be at least a part of a window for a vehicle. In a vehicle application, the electrochromic device 700 may be bent or otherwise shaped to conform to the body shape of the vehicle. The temperature for bending or otherwise shaping the electrochromic device can be in a temperature of at least 600° C. In a particular embodiment, the temperature is in a range of 600° C. to 700° C. The heat may be applied locally. The barrier layer 309 can help to reduce the likelihood of significantly adversely affecting the transparent conductive layer 410 during bending or otherwise shaping. The sintering portion of firing to form the bus bars may occur during the heat cycle used to bend the electrochromic device.

Figure 8:
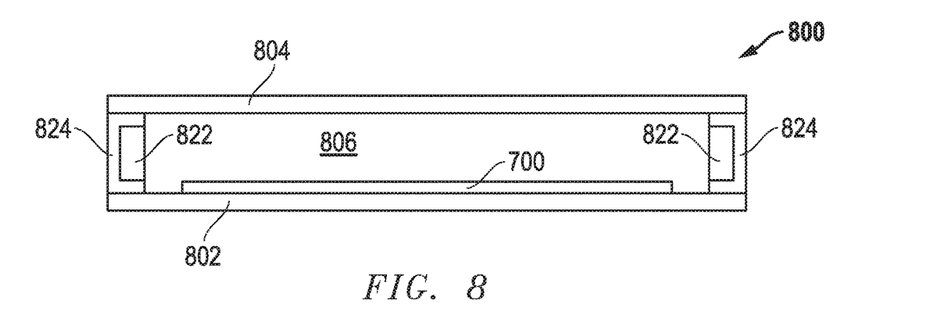
FIG. 8 includes illustration of a cross-sectional view of an insulating glass unit that includes the electrochromic device of FIG. 7.

In an embodiment, an insulated glass unit 800 may be formed, as illustrated in FIG. 8. The electrochromic device 700 can be coupled to a counter substrate 802 that is transparent to visible light. The counter substrate 802 may include a tempered or strengthened glass. In a particular embodiment, an adhesive (not illustrated) can be used between the electrochromic device 700 and the counter substrate 802. The insulated glass unit 800 can further include a glass panel 804, spacers 822, and a sealing material 824. Similar to the counter substrate 802, the glass panel 804 can include a tempered or strengthened glass. Furthermore, the glass panel 804 may be part of a laminate that can include a solar control layer, similar to the solar control layer as previously described with respect to the substrate 200. The insulated glass unit may include a solar control layer within the substrate 200 and not the glass panel 804, a solar control layer within or attached to the glass panel 804, or solar control layer with each of the substrate 200 and within or attached to the glass panel 804 may be used. In this last alternative, the solar control layers may serve different functions. For example, the solar control layer closer to the outside of a building may help to reject near infrared radiation, and the other solar control layer closer to the inside of the building may include a low emissivity material or help to rejection ultraviolet radiation. During a sealing operation, an inert gas (such as argon or krypton), $N_2$, air, or the like, may fill the gap 806.

Optionally, after forming the electrochromic device 700, the electrochromic device 700 may be annealed to reduce stress or for another purpose. The anneal may be performed separately from the firing. In another embodiment, the sintering portion of the firing may be combined with the anneal operation. The barrier layer 309 can allow a higher temperature for the anneal, an oxidizing ambient, such as air, or both to be used without significantly adversely affecting the transparent conductive layer 410. The anneal may be performed at a temperature in a range of 100° C. to 600° C.

A means for preventing (1) the mobile ion from migrating into the first transparent conductive layer, (2) Ag from migrating into the electrochromic layer or counter electrode layer, or both (1) and (2) helps to keep the electrochromic device operational longer when a Ag film is used as part of the transparent conductive layer 410. As previously described, the barrier layer 309 provides a means for preventing the mobile ion or Ag migration.

In another embodiment, the transparent conductive layer 202 can have a composition as previously described with respect to the transparent conductive layer 410. A barrier layer can be used between the layers 202 and 204 and have a composition and be formed as previously described with respect to the barrier layer 309.

Embodiments as described herein can allow for the integration of a low emissivity film within an EC stack and still have good operational characteristics. The barrier layer 309 or other means for preventing mobile ion or Ag migration can help to reduce or eliminate migration of mobile ions, such as Li+, into the transparent conductive layer, or migration of Ag into the EC or CE layers. Thus, a low emissivity film separate and spaced apart from the EC stack is not needed. Within the transparent conductive layer, the low emissivity film can be an Ag film that has good conductivity and has a thickness to allow sufficient transmission of visible light through the electrochromic device.

Many different aspects and embodiments are possible. Some of those aspects and embodiments are described below. After reading this specification, skilled artisans will appreciate that those aspects and embodiments are only illustrative and do not limit the scope of the present invention. Exemplary embodiments may be in accordance with any one or more of the ones as listed below.

Embodiment 1. An electrochromic device comprising:
a substrate;
an electrochromic layer or a counter electrode layer over the substrate, wherein the electrochromic or counter electrode layer includes a mobile ion;
a first transparent conductive layer over the substrate and including Ag; and
a barrier layer disposed between first transparent conductive layer and the electrochromic or counter electrode layer.

Embodiment 2. An electrochromic device comprising:
a substrate;
an electrochromic layer or a counter electrode layer over the substrate, wherein the electrochromic or counter electrode layer includes a mobile ion;
a first transparent conductive layer over the substrate and including Ag; and
means for preventing:
(1) the mobile ion from migrating into the first transparent conductive layer;
(2) Ag from migrating into the electrochromic layer or counter electrode layer; or both (1) and (2).

Embodiment 3. The electrochromic device of Embodiment 1 or 2, wherein the electrochromic device includes an electrochromic stack comprising:
the first transparent conductive layer;
the barrier layer;
the electrochromic layer;
the counter electrode layer; and
a second transparent conductive layer, wherein the first transparent conductive layer is coupled to one of the electrochromic layer and the counter electrode layer, and the second transparent conductive layer is coupled to the other of the electrochromic layer and the counter electrode layer.

Embodiment 4. A process of forming an electrochromic device comprising:
providing a substrate;
forming an electrochromic layer or a counter electrode layer over the substrate, wherein after forming the electrochromic or counter electrode layer, the electrochromic or counter electrode layer includes a mobile ion;
forming a barrier layer over the substrate; and
forming a first transparent conductive layer over the substrate and including Ag,
wherein forming the barrier layer is formed between forming the electrochromic or counter electrode layer and forming the first transparent conductive layer.

Embodiment 5. The process of Embodiment 4, wherein forming the barrier layer is performed using atomic layer deposition.

Embodiment 6. The process of Embodiment 4, wherein forming the barrier layer is performed using chemical vapor deposition.

Embodiment 7. The process of any one of Embodiments 4 to 6, wherein forming the barrier is performed using a metal-containing precursor including an organometallic compound, a metal halide, or a metal carbonyl compound.

Embodiment 8. The process of Embodiment 7, wherein the organometallic compound includes a metal alkyl compound, a metal alkoxide compound, or a dialkyl-amino metal, wherein each alkyl group or alkoxide group has no more than four carbon atoms.

Embodiment 9. The process of Embodiment 7 or 8, wherein the organometallic compound includes a tetrakis(alkyl) metal (IV), a tetrakis(dialkylamino) metal (IV), a tetrakis(alkoxide) metal (IV), or a bis(alkylcyclopentadienyl)alkoxyalkyl metal (IV), wherein each alkyl group and each alkoxide group has at most four carbon atoms.

Embodiment 10. The process of Embodiment 7 or 8, wherein the organometallic compound includes a pentakis(alkyl) metal (V), a pentakis(dialkylamino) metal (V), or a pentakis(alkoxide) metal (V), wherein each alkyl group and each alkoxide group has at most four carbon atoms.

Embodiment 11. The process of any one of Embodiments 7 to 9, wherein the organometallic compound includes $Al(CH_3)_3$.

Embodiment 12. The process of any one of Embodiments 4 to 11, wherein forming the barrier layer is performed using $H_2O$, $H_2O_2$, $O_2$, or $O_3$, or any combination thereof.

Embodiment 13. The process of any one of Embodiments 4 to 12, wherein forming the barrier layer is performed using $NH_3$, $N_2H_2$, or a mixture of $N_2$ and $H_2$, or any combination thereof.

Embodiment 14. The process of any one of Embodiments 4 to 13, wherein forming the barrier layer is performed using a silicon-containing gas.

Embodiment 15. The process of any one of Embodiments 4 to 14, wherein forming the barrier layer is formed using a plasma-assisted technique.

Embodiment 16. The process of any one of Embodiments 4 to 15, further comprising:
forming the other of the electrochromic layer or the counter electrode layer; and
forming a second transparent conductive layer,
wherein the first transparent conductive layer is coupled to one of the electrochromic layer and the counter electrode layer, and the second transparent conductive layer is coupled to the other of the electrochromic layer and the counter electrode layer.

Embodiment 17. The electrochromic device or the process of any one of the preceding Embodiments, wherein the barrier layer is conformal.

Embodiment 18. The electrochromic device or the process of any one of the preceding Embodiments, wherein the barrier layer has a thickness of at least 5 nm, at least 11 nm, or at least 15 nm.

Embodiment 19. The electrochromic device or the process of any one of the preceding Embodiments, wherein the barrier layer has a thickness of at most 200 nm, at most 100 nm, or at most 80 nm.

Embodiment 20. The electrochromic device or the process of any one of the preceding Embodiments, wherein the barrier layer has a thickness of in a range of 5 nm to 200 nm, 11 nm to 100 nm, or 15 nm to 80 nm.

Embodiment 21. The electrochromic device or the process of any one of Embodiments 4 to 12 and 15 to 20, wherein the barrier layer includes a metal oxide.

Embodiment 22. The electrochromic device or the process of Embodiment 21, wherein the barrier layer includes $Al_2O_3$.

Embodiment 23. The electrochromic device or the process of Embodiment 21, wherein the barrier layer includes $TiO_2$.

Embodiment 24. The electrochromic device or the process of any one of Embodiments 4 to 11, 13, and 15 to 20, wherein the barrier layer includes a metal nitride.

Embodiment 25. The electrochromic device or the process of Embodiment 24, wherein the barrier layer includes AN.

Embodiment 26. The electrochromic device or the process of Embodiment 24, wherein the barrier layer includes TiN.

Embodiment 27. The electrochromic device or the process of any one of Embodiments 4, 11, and 14 to 20, wherein the barrier layer includes metal-silicon compound.

Embodiment 28. The electrochromic device or the process of Embodiment 27, wherein the barrier layer includes a titanium silicon nitride, a tantalum silicon nitride, or a tungsten silicon nitride.

Embodiment 29. The electrochromic device or the process of any one of the preceding Embodiments, wherein the barrier layer is spaced apart from the Ag within the first transparent conductive layer.

Embodiment 30. The electrochromic device or the process of any one of the preceding Embodiments, further comprising a first transparent conductive oxide between the Ag and the barrier layer.

Embodiment 31. The electrochromic device or the process of any one of the preceding Embodiments, further comprising a second transparent conductive oxide along a side of the Ag that is opposite the barrier layer.

Embodiment 32. The electrochromic device or the process of any one of the preceding Embodiments, further comprising an electrolyte layer between the electrochromic layer and the counter electrode layer.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An electrochromic device comprising:
   a substrate;
   an electrochromic layer or a counter electrode layer over the substrate, wherein the electrochromic or counter electrode layer includes a mobile ion;
   a first transparent conductive layer over the substrate and including Ag; and
   a barrier layer disposed between first transparent conductive layer and the electrochromic or counter electrode layer, wherein the barrier layer is spaced apart from the Ag within the first transparent conductive layer.

2. The electrochromic device of claim 1, wherein the barrier layer is conformal.

3. The electrochromic device of claim 2, wherein the barrier layer has a thickness of in a range of 5 nm to 200 nm.

4. The electrochromic device of claim 1, wherein the barrier layer includes a metal oxide.

5. The electrochromic device of claim 4, wherein the barrier layer includes $Al_2O_3$.

6. The electrochromic device of claim 4, wherein the barrier layer includes $TiO_2$.

7. The electrochromic device of claim 1, further comprising a first transparent conductive oxide between the Ag and the barrier layer.

8. An electrochromic device comprising:
   a substrate;
   an electrochromic stack comprising:
      an electrochromic layer or a counter electrode layer over the substrate, wherein the electrochromic or counter electrode layer includes a mobile ion;
      a first transparent conductive layer over the substrate and including Ag; and
      a barrier layer disposed between first transparent conductive layer and the electrochromic or counter electrode layer; and
   a second transparent conductive layer,
   wherein the first transparent conductive layer is coupled to one of the electrochromic layer and the counter electrode layer, and the second transparent conductive layer is coupled to the other of the electrochromic layer and the counter electrode layer.

9. A process of forming an electrochromic device comprising:
   providing a substrate;
   forming an electrochromic layer or a counter electrode layer over the substrate, wherein after forming the electrochromic or counter electrode layer, the electrochromic or counter electrode layer includes a mobile ion;
   forming a barrier layer over the substrate; and
   forming a first transparent conductive layer over the substrate and including Ag,
   wherein forming the barrier layer is formed between forming the electrochromic or counter electrode layer and forming the first transparent conductive layer, and
   wherein forming the barrier is performed using a metal-containing precursor including an organometallic compound, a metal halide, or a metal carbonyl compound.

10. The process of claim 9, wherein forming the barrier layer is performed using atomic layer deposition.

11. The process of claim 10, wherein the barrier layer is conformal.

12. The process of claim 10, wherein the barrier layer has a thickness of in a range of 5 nm to 200 nm.

13. The process of claim 9, wherein the organometallic compound includes a metal alkyl compound, a metal alkoxide compound, or a dialkyl-amino metal, wherein each alkyl group or alkoxide group has no more than four carbon atoms.

14. The process of claim 9, wherein forming the barrier layer is performed using $H_2O$, $H_2O_2$, $O_2$, or $O_3$, or any combination thereof.

15. The process of claim 14, wherein the barrier layer includes a metal oxide.

16. The process of claim 15, wherein the barrier layer includes $Al_2O_3$ or $TiO_2$.

17. The process of claim 9, wherein the barrier layer is spaced apart from the Ag within the first transparent conductive layer.

18. The process of claim 17, further comprising a first transparent conductive oxide between the Ag and the barrier layer.

* * * * *